Oct. 27, 1925.                                     1,559,462
R. M. RYAN
HYDRAULIC BRAKE
Filed Nov. 13, 1924        3 Sheets-Sheet 1
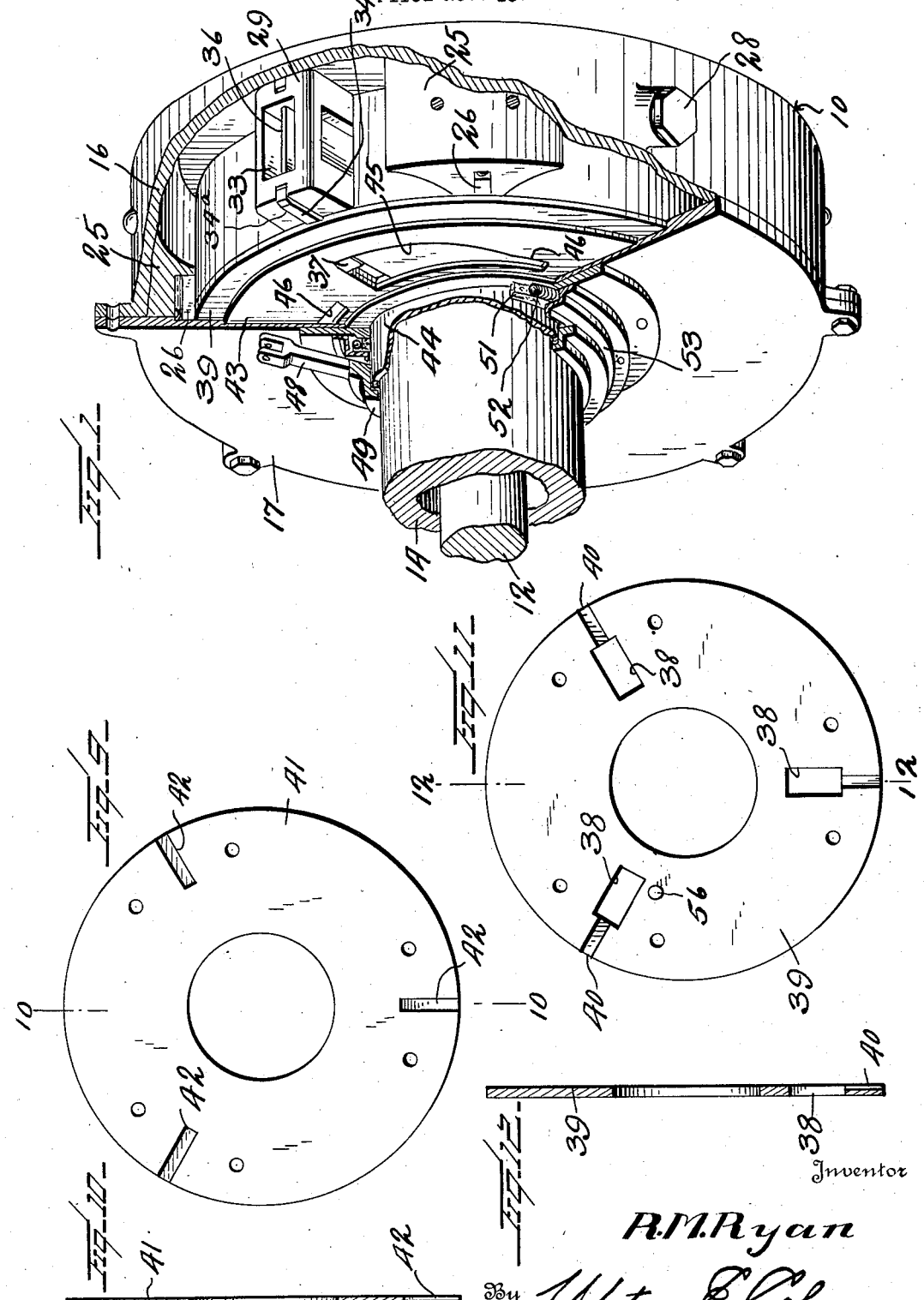

Oct. 27, 1925.
R. M. RYAN
1,559,462
HYDRAULIC BRAKE
Filed Nov. 13, 1924
3 Sheets-Sheet 2
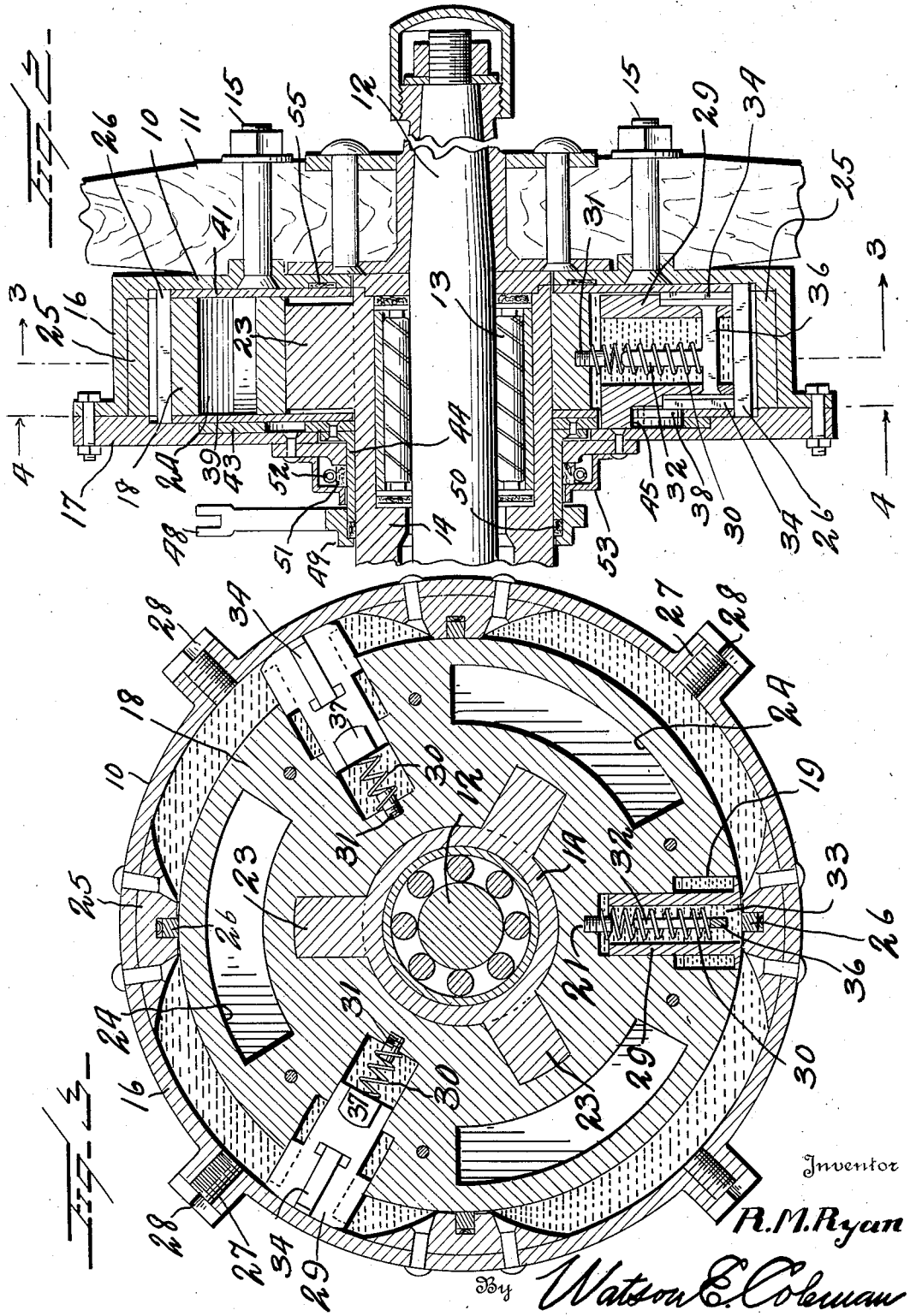
Inventor
R. M. Ryan
By Watson E. Coleman
Attorney

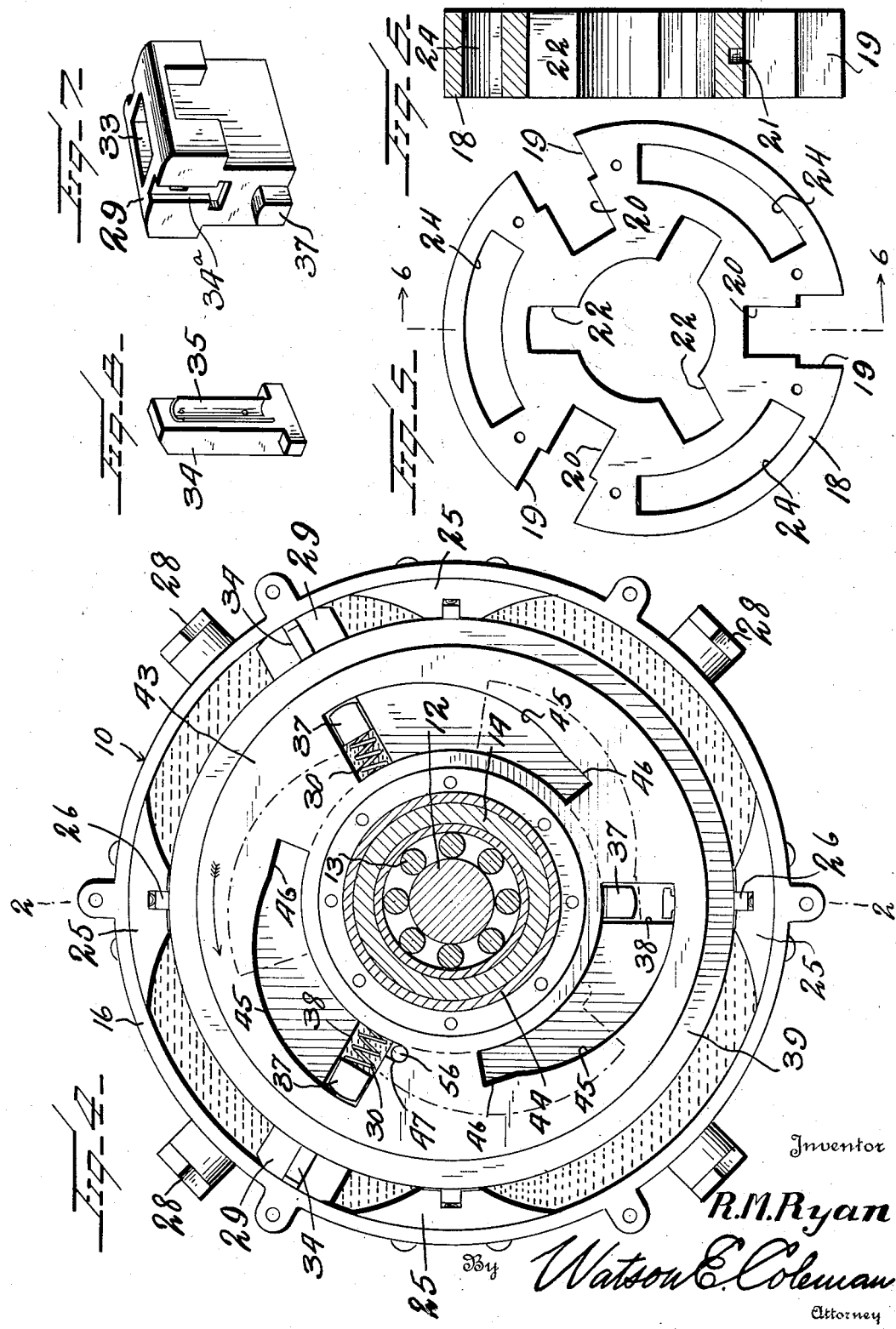

Patented Oct. 27, 1925.

1,559,462

UNITED STATES PATENT OFFICE.

ROBERT M. RYAN, OF MINNEAPOLIS, MINNESOTA.

HYDRAULIC BRAKE.

Application filed November 13, 1924. Serial No. 749,753.

*To all whom it may concern:*

Be it known that I, ROBERT M. RYAN, a citizen of the United States, residing at Minneapolis, in the county of Hennepin and State of Minnesota, have invented certain new and useful Improvements in Hydraulic Brakes, of which the following is a specification, reference being had to the accompanying drawings.

This invention relates to brakes, and particularly to hydraulic brakes for motor driven vehicles, elevators and other apparatus of this character.

The general object of the invention is to provide a brake that does not depend upon friction between the parts of the mechanism for its braking effect, thereby to a large extent eliminating wear.

A further object is to provide a brake of this character which can be operated continuously over prolonged periods without damage to the mechanism, which will give accurate speed control, and which is silent in operation.

Other objects will appear in the course of the following description.

My invention is illustrated in the accompanying drawings, wherein:—

Figure 1 is a perspective view partly broken away of my hydraulic brake;

Figure 2 is a diametric sectional view on the line 2—2 of Figure 4;

Figure 3 is a section on the line 3—3 of Figure 2;

Figure 4 is a section on the line 4—4 of Figure 2;

Figure 5 is a side elevation of the central fixed element;

Figure 6 is a section on the line 6—6 of Figure 5;

Figure 7 is a perspective view of one of the plungers;

Figure 8 is a perspective view of the lateral packing strip for the plunger;

Figure 9 is an elevation of the end plate 41;

Figure 10 is a section on the line 10—10 of Figure 9;

Figure 11 is an elevation of the end plate 39;

Figure 12 is a section on the line 12—12 of Figure 11;

Referring to these drawings, and particularly to Figures 1 to 4, it will be seen that my improved brake comprises a revolving drum 10 which is rigidly attached to the wheel 11 or other moving element. This wheel is mounted upon the axle spindle 12 which operates in anti-friction bearings 13 carried within the housing 14. The drum 10 is shown as bolted to the wheel by bolts 15 but I, of course, do not wish to be limited to this. The drum 10 is angularly flanged on one face, as at 16, to receive the abutting faces of a cover plate 17 which is bolted to this flange of the drum and whose detailed construction will be later stated.

Disposed within the drum is a stationary element, designated 18, which has a width or thickness sufficient to fill the space between the cover plate and the drum, and this member 18 is circular in form and provided at intervals, as at three equidistant points, with inwardly extending recesses 19, these recesses having a certain width for a predetermined depth and then narrowing, as at 20. A screw-threaded socket or bore 21 opens from the lower end of the reduced portions 20 of these recesses. The middle portion of the stationary element is circular to fit upon the housing 14 and is formed with radially extending recesses 22 which open into this circular central portion to receive keys or wings 23 on the housing to thereby lock the stationary element to the housing, as shown best in Figure 3. The stationary element 18 is also formed with a plurality of circumferentially extending openings 24 merely designed to lighten the weight of the stationary element.

The inner surface of the revolving drum has rigidly attached thereto the oppositely inclined blocks 25 which are riveted or otherwise attached to the drum, these blocks being transversely recessed at their middles to receive within them the packing strips 26 which are urged outward by means of springs or other suitable means, springs being shown for this purpose.

The stationary element 18 is smaller in diameter than the interior of the drum so that a peripheral space is left between the periphery of the stationary element and the inner face of the drum. This space is divided by the four abutments 25 into four equal sized compartments. Each one of these compartments is provided with a filling opening 27 closed by a plug 28 which may be readily removed to permit the oil to be filled into these compartments. There are four of these abutment members 25 illustrated, though more or less may be used. There are three of the recesses 19 in the fixed element 18 and in each of these recesses there is disposed an outwardly sliding plunger 29 having a width approximately equal to the thickness of the fixed element 18 and having the outer portion of each flanged to sufficient width to fit the recess 19 and the inner portion of the plunger reduced in width so as to fit the recess 20.

The plunger is urged outwardly by a spring 30 which at its inner end is mounted upon a pin 31 engaging in the socket 21, while the outer end of the spring is engaged with an inwardly extending pin 32 mounted upon the plunger, the details of which will be later described. The plunger is hollow so that the space 33 between the walls of the plunger is filled with oil. The outer face of the plunger is rounded in the direction of rotation of the movable element 10. The side faces of each plunger are recessed at $34^a$ to receive packing strips 34 which are forced outward by springs 35. The pin 32, as shown in Figure 2, is mounted upon a transverse rod 36 mounted in the side walls of the recess in the head of the plunger so that this pin does not impede the free movement of the oil into the interior of the plunger.

It will be seen now that as the drum 10 rotates around the fixed element 18, the inclined faces of the blocks 25 or abutments will successively strike the plungers 29 and force these plungers inward into the recesses 19 so as to permit the abutments to pass the plungers 25. As soon as the crest of an abutment has passed, the plunger will be moved outward by the action of the spring 30.

Each plunger at its inner end is provided with a laterally projecting lug 37 which passes through radial slots 38 in a cover plate 39 which is attached by screws, rivets or other suitable means to the stationary element and move therewith, there being slots 40 extending from the slots 38 to receive and accommodate the spring-projected packing strips 34. The opposite face of the drum carries the cover plate 41 which is also slotted, as at 42, to receive and accommodate the packing strips on that side and which are attached to the fixed member 18 in any manner, as by screws or the like.

Also disposed within a recess in the cover plate 17 is a control plate 43. This plate, as shown in Figure 4, is formed at its center to surround the housing 14 and oscillate thereon and is carried by a sleeve 44 which surrounds the housing and oscillates thereon. The control plate 43 is formed with three circumferentially extending slots 45, the inner faces of these slots being concentric to the central opening of the control plate but the ends of the slots being larger at one end than at the other, the outer edge face of the slot, therefore, extending not only circumferentially but inwardly and the rear extremity of the slot being uniform in width for a distance, as at 46. One of these slots at its larger end is formed with the extension 47 adjacent the base of the slot. The lugs 37 on the plungers extend out through the openings in the plate 39 and also into these slots 45, and as the control plate is oscillated in one direction or the other the plungers will be either permitted to shift outward under the action of the springs or will be retracted under the action of the cam-like outer edge face of the slot.

This control plate and the sleeve upon which it is mounted may be operated in any suitable manner but, as illustrated, this control plate is attached by screws, rivets or like devices passing through the control plate into the collar or sleeve 44, and to this sleeve 44 is attached the control lever 48. This lever 48 is mounted upon a ring 49, which in turn embraces the sleeve 44 and constitutes a stuffing box having therein packing 50. A rawhide band 51 surrounds the collar or sleeve 44 and is held in contact with the sleeve by means of a circular coiled spring 52 which prevents any possible leakage of oil at this point, this spring and the band being held within an annular housing 53. A rawhide washer 55 may also be disposed in a recess on the inside face of the rotatable member 10 which prevents leakage of the lubricant from around the roller bearings. The roller bearings may be lubricated in any suitable manner and various means may be used to prevent passage of oil used in the brake to the roller bearings.

Disposed on the plate 39 is a projecting pin 56 which engages in the extension 47 of one of the cam slots 45 in order to prevent any interference with the movement of the plungers through side pressure on the lugs 37. The packing strips 34 have heads at their inner ends which engage with the inner enlarged ends of the grooves $34^a$ of the plunger so as to insure the movement of these packing pieces with the plunger. It will be observed that the plunger spring 30 is not located at the exact middle of the plunger but placed as near as practical to the lug 37. The faces of the abutments are so curved as to give a practically uniform acceleration to the plungers, and the faces of the plungers are curved to conform to the curvature of the inner face of the drum 10, while the ends of said faces are curved to conform to the curvature of the abutments. This assures ample bearing surface between an abutment and the plunger during the time that the latter is being forced into its recess in the element 18.

The operation of this mechanism is as follows: The four compartments between the outer drum and the stationary element are filled with oil. The plungers are hollow so that the interior of the plungers and the recesses in the stationary element in which the plungers are operated are at all times filled with oil. The volume of oil in any one of the compartments defined by the rotatable element and the fixed element and two abutments is the same at all times. If the plungers are fully extended against the inner surface of the drum 10, by rotating the control plate 43, the oil on either side of the extended plungers is confined between the plungers and the inclined abutments 25. Thus movement of the revolving drum 10 in either direction is prevented and the brake is fully applied or locked. If, however, by means of the lever 48 and the control plate the plungers are drawn in somewhat from the inner surface of the drum 10 so as to permit the passage of oil past the outer end of the plungers, the drum 10 may then revolve in either direction. The speed of revolution of the drum 10 is governed by the size of the oil passage between the inner surface of the drum and the outer end of the plungers. With the brake thus partially set and the drum 10 revolving, the inclined abutments 25 upon approaching a plunger will, because of their shape, force the plunger into its recess in the element 18, pass over it, and allow it to move out into its former position in the next compartment. With the brake fully applied, as shown in Figure 3, there are always two plungers that are active, that is which bear against the inner face of the drum, thus making the resistance to rotation uniform throughout each revolution. It is obvious that with the plungers fully withdrawn into their recesses in the element 18, there will be no resistance to rotation and the brake may be said to be fully released.

Preferably the part 18 is cast and the part 10 will be formed of sheet metal, though I do not wish to be limited to this. Inasmuch as the central opening in the element 18 is formed to fit over a similarly shaped spider on the end of the axle housing, it is obvious that the central element is prevented from rotating, although it has sufficient freedom of movement parallel to the axis of the shaft to keep it in perfect alignment with the revolving drum 10 at all times. The hollow construction of the plungers combined with their exterior design provides that all pressure of oil in a radial direction or pressure that might prevent either radial movement of the plungers or interfere with their proper functioning shall be equalized, thus insuring their freedom of movement regardless of the oil pressure.

While I have illustrated my device as applied to the wheel of an automobile, I do not wish to be limited to this as it is obvious that the brake might be used in connection with any machine where a braking apparatus is required, and it will also be obvious that it may be modified in minor respects without departing from the spirit of the invention.

I claim:—

1. A brake comprising a central fixed member, an exterior rotatable drum larger than the exterior of the fixed member, the space between the drum and fixed member being designed to be filled with liquid, inwardly projecting abutments at intervals on the rotatable member defining a series of compartments, outwardly projectable plungers mounted upon the fixed member for movement toward or from the surface of the drum, and manually operable means for simultaneously projecting or withdrawing all of said plungers.

2. A brake comprising a central fixed member, an exterior rotatable drum larger than the exterior of the fixed member, the space between the drum and fixed member being designed to be filled with liquid, inwardly projecting abutments at intervals on the rotatable member defining a series of compartments, outwardly projectable plungers mounted upon the fixed member for movement toward or from the surface of the drum, and manually operable means for simultaneously projecting or withdrawing all of said plungers, said means comprising an oscillatable disk having cam slots, one for each plunger, the plunger having means engaging the corresponding cam slot.

3. A brake comprising a central fixed member, an exterior rotatable drum larger than the exterior of the fixed member, the space between the drum and fixed member being designed to be filled with liquid, inwardly projecting abutments at intervals on the rotatable member defining a series of compartments, outwardly projectable plungers mounted upon the fixed member for movement toward or from the surface of the drum, and manually operable means for simultaneously projecting or withdrawing all of said plungers, said plungers being hollow to permit the passage of liquid into the interior of the plunger.

4. A brake comprising a central fixed member, an exterior rotatable drum larger than the exterior of the fixed member, the space between the drum and fixed member being designed to be filled with liquid, inwardly projecting abutments at intervals on the rotatable member defining a series of compartments, outwardly projectable plungers mounted upon the central member for movement toward or from the surface of the drum, and manually operable means for simultaneously projecting or withdrawing all of said plungers, each of said plunger recesses in the fixed member being formed to provide a main relatively wide recess adjacent the periphery of the fixed member and a narrow counterrecess remote from the periphery of the fixed member, each plunger being formed with an enlarged head fitting the first named portion of the recess and the narrow portion fitting the last named portion of the recess, the plunger being hollow whereby to permit liquid contained within a compartment to pass into the interior of the plunger and circulate through said recesses in the fixed member.

5. A brake of the character described comprising an outer rotatable drum having a plurality of inwardly projecting abutments on its inner face, each abutment having oppositely inclined faces and being transversely recessed at its middle, a spring-projected packing strip disposed in said recess, a fixed member disposed within the drum and having transversely extending recesses at a plurality of points, a series of spring projected plungers mounted in said recesses, the outer end faces of the plungers being rounded, manually operable means for retracting the plungers against the action of said springs, and spring-projected packing strips carried upon the outer faces of the plungers.

6. A hydraulic brake of the character described comprising a drum composed of a main section and a cover section, the periphery of the drum being formed with a plurality of inwardly projecting abutments with reversely inclined side faces, a fixed member disposed concentrically within the drum and having a plurality of radially disposed recesses, radially disposed plungers mounted in said recesses, each of these plungers being formed with a laterally projecting lug, end plates mounted on the ends of said fixed member and forming part thereof, one of said end plates being radially slotted to permit the projection of said lugs, a controlling member mounted between said last named end plate and the cover plate of the rotatable member and having a series of cam slots engaging said lugs and causing the retraction of the plungers upon an oscillation of the controlling plate in one direction and permitting a projection of the plungers upon an oscillation of the controlling plate in the other direction, a sleeve carried by said controlling plate and projecting out through the center of the cover plate, and manually operable means engaged with said sleeve whereby the controlling plate may be operated.

7. A hydraulic brake of the character described comprising a drum composed of a main section and a cover section, the periphery of the drum being formed with a plurality of inwardly projecting abutments with reversely inclined side faces, a fixed member disposed concentrically within the drum and having a plurality of radially disposed recesses, radially disposed plungers mounted in said recesses, each of these plungers being formed with a laterally projecting lug, end plates mounted on the ends of said fixed member and forming part thereof, one of said end plates being radially slotted to permit the projection of said lugs, a controlling member mounted between said last named end plate and the cover plate of the rotatable member and having a series of cam slots engaging said lugs and causing the retraction of the plungers upon an oscillation of the controlling plate in one direction and permitting a projection of the plungers upon an oscillation of the controlling plate in the other direction, a sleeve carried by said controlling plate and projecting out through the center of the cover plate, manually operable means engaged with said sleeve whereby the controlling plate may be operated, a packing gland carried upon the cover plate, and packing within the gland resting upon said sleeve preventing passage of liquid therethrough.

8. A hydraulic brake comprising an outer rotatable drum, a fixed centrally disposed element having radial recesses and smaller than the drum, the drum having inwardly projecting abutments engaging said element, the space between the drum and element being adapted to be filled with liquid, a series of plungers mounted in the recesses of said fixed element and urged outward against the drum, each of said plungers being hollow from its outer end inward and the side faces of said plungers being open whereby the space within said recesses and behind said plungers may be filled with liquid when the plungers are projected and the liquid discharged therefrom as the plungers are drawn inward, and manually operable means for controlling the position of the plungers.

9. A hydraulic brake comprising an outer rotatable drum, a fixed centrally disposed element having radial recesses and smaller than the drum, the drum having inwardly projecting abutments engaging said element, the space between the drum and element being adapted to be filled with liquid, a series of plungers mounted in the recesses of said fixed element and urged outward against the drum, each of said plungers being hollow from its outer end inward and the side faces of said plungers being open whereby the space within said recesses and behind said plungers may be filled with liquid when the plungers are projected and the liquid discharged therefrom as the plungers are drawn inward, manually operable means for controlling the position of the plungers, and means for urging the plungers outward comprising a spring disposed between the inner end of each recess and the inner end of each plunger, each plunger having a transverse bar formed to provide an inwardly projecting pin around which the spring is mounted, there being a pin at the lower end of the recess to receive the inner end of said spring.

In testimony whereof I hereunto affix my signature.

ROBERT M. RYAN.